(12) United States Patent
Liu et al.

(10) Patent No.: US 11,877,257 B2
(45) Date of Patent: Jan. 16, 2024

(54) INCREASING MOBILE DEVICE POSITIONING ACCURACY

(71) Applicant: ZTE Corporation, Guangdong (CN)

(72) Inventors: Xu Liu, Shenzhen (CN); Bo Dai, Shenzhen (CN); Xiubin Sha, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/172,078

(22) Filed: Feb. 21, 2023

(65) Prior Publication Data
US 2023/0199700 A1    Jun. 22, 2023

Related U.S. Application Data

(63) Continuation of application No. 16/968,557, filed as application No. PCT/CN2018/075949 on Feb. 9, 2018, now Pat. No. 11,601,909.

(51) Int. Cl.
*H04W 64/00* (2009.01)
*H04B 17/309* (2015.01)
*G01S 5/02* (2010.01)

(52) U.S. Cl.
CPC ........... *H04W 64/00* (2013.01); *G01S 5/0244* (2020.05); *H04B 17/309* (2015.01)

(58) Field of Classification Search
None
See application file for complete search history.

(56) References Cited

U.S. PATENT DOCUMENTS

| 9,482,742 | B1 | 11/2016 | Fischer |
| 2010/0323719 | A1 | 12/2010 | Jen |
| 2011/0294499 | A1 | 12/2011 | Vikberg et al. |
| 2012/0264449 | A1 | 10/2012 | Kazmi et al. |
| 2016/0205499 | A1 | 7/2016 | Davydov et al. |
| 2017/0150436 | A1 | 5/2017 | Modarres Razavi et al. |
| 2018/0324740 | A1 | 11/2018 | Edge et al. |
| 2019/0104431 | A1 | 4/2019 | Gunnarsson et al. |

(Continued)

FOREIGN PATENT DOCUMENTS

| CN | 101990297 A | 3/2011 |
| CN | 102307385 A | 1/2012 |
| CN | 102308385 A | 1/2012 |

(Continued)

OTHER PUBLICATIONS

International Search Report and Written Opinion dated May 30, 2018 for International Application No. PCT/CN2018/075949, filed on Feb. 9, 2018 (6 pages).

(Continued)

*Primary Examiner* — Adolf Dsouza
(74) *Attorney, Agent, or Firm* — Perkins Coie LLP

(57) ABSTRACT

Methods, systems, and devices related to data transmission and accuracy for positioning User Equipment (UE) in a network are described. In one exemplary aspect, a method for wireless communication includes selecting, by a mobile device, one or more cells in a wireless network for facilitating a positioning of the mobile device in the wireless network. The method also includes transmitting, from the mobile device to a network node, a message to request assistance data corresponding to the one or more selected cells.

20 Claims, 15 Drawing Sheets

(56) References Cited

U.S. PATENT DOCUMENTS

2019/0349881 A1* 11/2019 Choi .................. H04W 76/27
2021/0045084 A1   2/2021 Liu et al.

FOREIGN PATENT DOCUMENTS

| | | |
|---|---|---|
| CN | 105981420 A | 9/2016 |
| CN | 106716169 A | 5/2017 |
| CN | 107079412 A | 8/2017 |
| JP | 2009-529835 A | 8/2009 |
| KR | 10-2014-0068125 A | 6/2014 |
| KR | 10-2017-0075733 A | 7/2017 |
| KR | 10-2017-0140629 A | 12/2017 |
| WO | 2007/103975 A2 | 9/2007 |
| WO | 2015090096 A1 | 6/2015 |
| WO | 2017026791 A1 | 2/2017 |
| WO | 2017172138 A1 | 10/2017 |

OTHER PUBLICATIONS

Office Action for Chinese Patent Application No. 201880087537.2, dated Apr. 21, 2021.
Office Action for Korean Patent Application No. 10-2020-7024865, dated Jul. 9, 2021.
Office Action for Chinese Patent Application No. 201880087537.2, dated Jan. 30, 2022 (18 pages).
Office Action for Korean Patent Application No. 10-2020-7024865, dated Mar. 18, 2020 (9 pages).

* cited by examiner

INCREASING MOBILE DEVICE POSITIONING ACCURACY

CROSS REFERENCE TO RELATED APPLICATIONS

This patent document is a continuation of U.S. patent application Ser. No. 16/968,557, filed Aug. 7, 2020, which is a national phase application and claims the benefit of priority to International Patent Application No. PCT/CN2018/075949, filed on Feb. 9, 2018. The entire contents of the before-mentioned patent applications are incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communication, and more specifically, to techniques related to data transmission and accuracy for positioning User Equipment (UE) in a network.

In one exemplary aspect, a method for wireless communication. The method includes selecting, by a mobile device, one or more cells in a wireless network for facilitating a positioning of the mobile device in the wireless network; and transmitting, from the mobile device to a network node, a message to request assistance data corresponding to the one or more selected cells.

In some embodiments, the selecting the one or more cells includes selecting the one or more cells from multiple neighboring cells of the mobile device based on signal qualities corresponding to the individual neighboring cells of the mobile device. In some implementations, the selecting the one or more cells includes selecting the one or more cells based on a list of cells previously used for a positioning of the mobile device. In some embodiments, the network node comprises an Evolved Serving Mobile Location Center.

In another exemplary aspect, a method for wireless communication. The method includes receiving, at a network node, a message from a mobile device, the message including a request for assistance data corresponding to one or more cells selected by the mobile device for facilitating a positioning of the mobile device in a wireless network; and transmitting, from the network node to the mobile device, the assistance data corresponding to the one or more cells selected by the mobile device.

In some embodiments, the network node comprises an Evolved Serving Mobile Location Center. In some embodiments, the assistance data corresponding to the one or more cells is determined based on previously stored assistance data for the mobile device.

In another exemplary aspect, a method for wireless communication is disclosed. The method includes receiving, at a wireless communication node, a first message that indicates a positioning request for a mobile device or a completion of capabilities and assistance data exchange between a mobile device and a network node.

In some embodiments, the method includes transmitting, from the wireless communication node, a second message to the mobile device to instruct the mobile device to perform positioning measurements in a connected state. In some embodiments, the method includes transmitting, from the wireless communication node, a second message to the mobile device to instruct the mobile device to perform a fast release of a current connection for performing positioning measurements in an idle state.

In some embodiment, the method further includes receiving, at the wireless communication node, prior to receiving the first message, a third message from the mobile device, the third message including information that indicates a capability of the mobile device for performing positioning measurements in the connected state. In some embodiments, third message is transmitted in a random access procedure. In some implementations, the third message includes a Msg3 or a Msg5.

In some embodiments, the first message includes information indicating a capability of the mobile device for performing positioning measurements in the connected state. In some embodiments, the transmitting the second message includes transmitting, based on a coverage level of a serving cell of the mobile device and the capability of the mobile device for performing positioning measurements in the connected state, the second message to the mobile device to instruct the mobile device to perform positioning measurements in the connected state.

In another exemplary aspect, a method for wireless communication is disclosed. The method includes transmitting, from a mobile device, a first message to a wireless communication node, the first message that indicates a positioning request for a mobile device or a completion of capabilities and assistance data exchange between the mobile device and a network node.

In some embodiments, the method includes receiving, at the mobile device, a second message from the wireless communication node to instruct the mobile device to perform positioning measurements in a connected state. In some embodiments, the method includes receiving, at the mobile device, a second message from the wireless communication node to instruct the mobile device to perform a fast release of a current connection for performing positioning measurements in an idle state. In some implementations, the method further includes performing, by the mobile device, positioning measurements in the connected state after receiving the second message.

In some embodiments, the method includes transmitting, from the mobile device, prior to transmitting the first message, a third message to the wireless communication node, wherein the third message includes information indicating a capability of the mobile device for performing positioning measurements in the connected state. In some embodiments, the third message is transmitted in a random access procedure. In some implementations, the third message includes a Msg3 or a Msg5.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

In wireless communication systems, mobile device positioning functionality provides mechanisms, based on measuring radio signals, to support or assist the calculation of the geographical position of a mobile device (e.g., a UE). The position knowledge of a UE can be used, for example, in support of Radio Resource Management functions, as well as location-based services for operators, subscribers, and third-party service providers.

Figure 1:
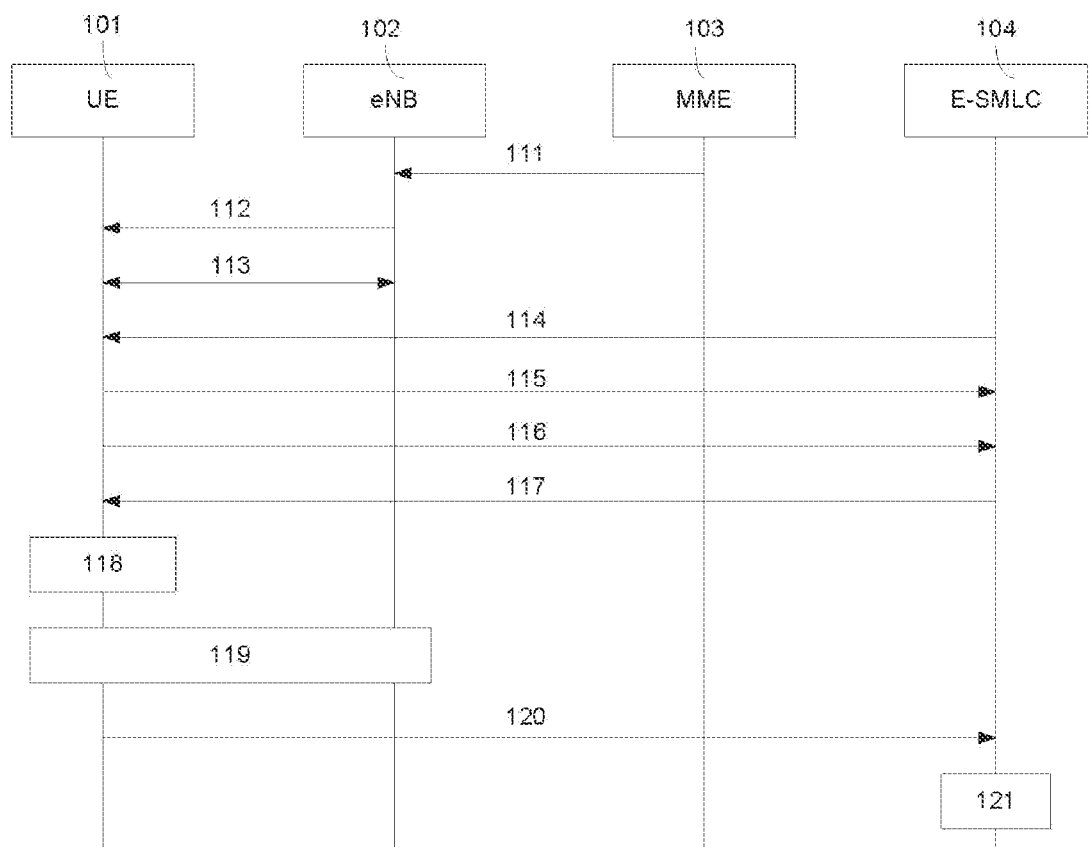
FIG. 1 is a diagram showing representative signaling steps of a positioning process used in the current wireless communication systems.

FIG. 1 is a diagram showing representative signaling steps of a positioning process used in the current wireless communication systems. For a UE in an idle state, the positioning process can be triggered when the network side has a positioning requirement. For example, a Mobility Management Entity (MME) 103 sends a first paging message 111 to a base station 102 (e.g., an evolved NodeB (eNB), or a gNB). The UE 101 is initially in an idle state. The base station 102 wakes up the UE 101 by sending the UE a second paging message 112. The UE 101 then triggers a random access procedure 113 so that it can switch to a connected state. After the UE 101 is in the connected state, a positioning server 104, such as an Evolved Serving Mobile Location Center (E-SMLC), exchanges relevant positioning information with the UE 101. For example, the E-SMLC 104 sends a message 114 to the UE 101 to request its location information. The UE first sends a message 115 to the E-SMLC 104 to report its positioning capabilities. The UE then sends a message 116 to the E-SMLC 104 to request assistance data. After the UE receives the assistance data in a message 117 from the E-SMLC 104, it enters into the idle state 118 again to perform positioning measurements. After the measurements are completed, the UE switches back into the connected state 119 to report its measurements to the E-SMLC 104 in a message 120. The E-SMLC 104 can obtain the location information 121 of the UE after receiving the measurements from the UE 101.

Currently, the Narrow Band (NB) Internet of Things (IoT) systems only support idle state positioning. That is, the positioning measurement is performed in the idle state only. In order to complete the positioning process, the UE must undergo several state transitions: as shown in FIG. 1, the UE switches from the idle state to the connected state after receiving the paging message, switches to the idle state to perform measurements, and switches back to the connected state to report the measurements. Furthermore, the amount of assistance data is large. In many cases, the assistance data for the UE remains unchanged, yet the UE requests it for each positioning process regardless whether its position has changed.

Therefore, the current positioning process is inefficient in terms of bandwidth utilization and complexity of implementation. The techniques described in the present document can be used by embodiments in which the UE can request a smaller amount of assistance data while improving the accuracy of the positioning process. The disclosed techniques can also be used by embodiments in which the UE can undergo fewer number of state transitions to obtain the assistance data when the UE is capable of performing positioning measurements in a connected state, thereby reducing system resource overhead and power consumption of the UE.

Details of the disclosed techniques are described in the following embodiments.

Example Embodiment 1

In current wireless communication systems, the E-SMLC does not know the specific location of the UE in its serving cell. Therefore, the E-SMLC tends to configure a relatively large neighborhood cell list for the UE. Acquiring assistance data for the cells in the large list can increase power consumption of the UE. Furthermore, without UE-specific information, high-quality cell(s) that are helpful for UE positioning can still be omitted from the large list, resulting in suboptimal accuracy in the final positioning results. This embodiment describes techniques that can be used to reduce the amount of assistance data yet improve accuracy of the UE positioning process.

Figure 2:
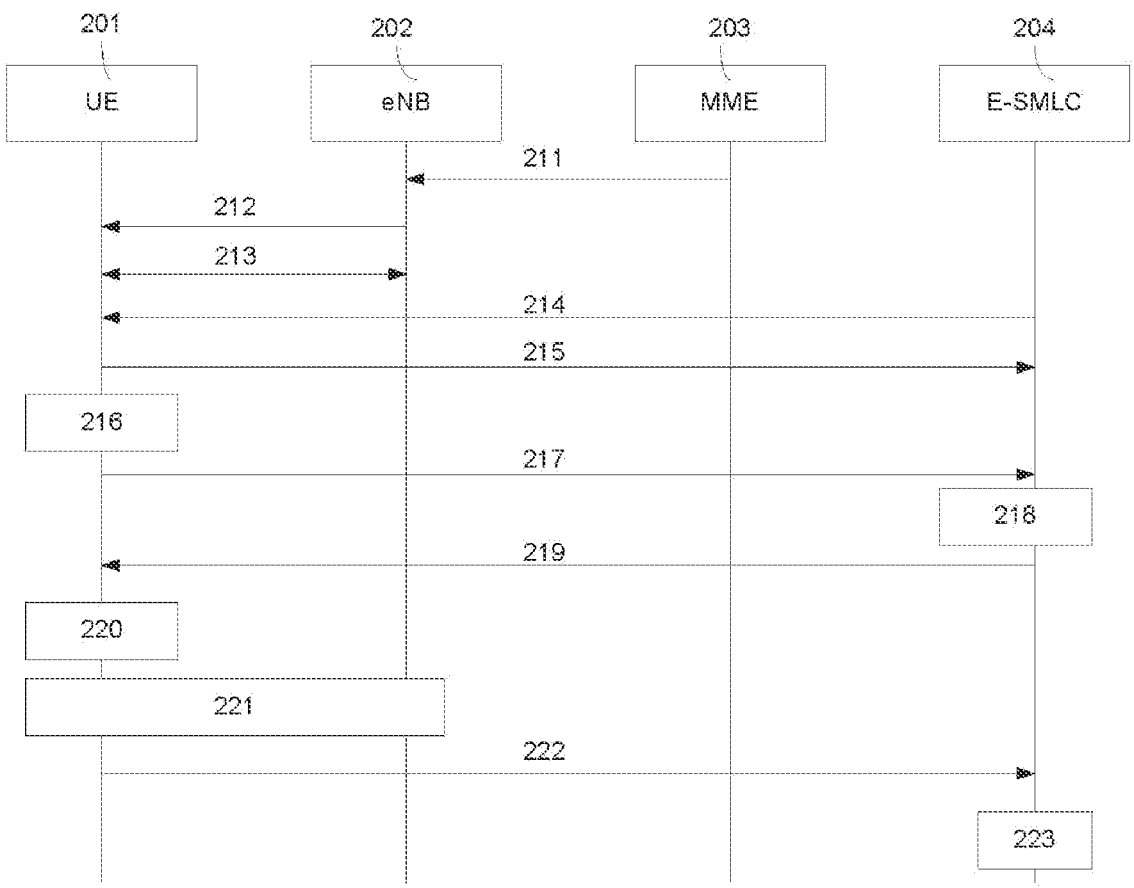
FIG. 2 is a diagram showing a representative signaling process in accordance with the disclosed techniques.

FIG. 2 is a diagram showing a representative signaling process in accordance with the disclosed techniques. The positioning process can be triggered when the network side has a positioning requirement. For example, the MME 203 sends a first paging message 211 to a eNB 202.

The UE 201 is initially in an idle state. The eNB 202 sends the UE 201 a second paging message 212. After receiving the second paging message 212, the UE 201 starts a Radio Resource Control (RRC) connection establishment procedure 213 to enter into a connected state. After the UE 201 is in the connected state, the UE receives a capability request 214 from the E-SMLC 204, and reports its positioning capabilities in a message 215 to the E-SMLC 204.

The UE 201 then selects a list of recommended cells 216 for facilitating the positioning of the UE. Using the current positioning methods, such as the Observed Time Difference Of Arrival (OTDOA) method, the UE 201 needs at least three cells to calculate accurate position information. The UE 201 can select three or more cells to form the list of recommended cells based on signal quality in the cells. For example, three cells having the best signal quality can be selected by the UE 201. The UE 201 then transmit a message 217 to the E-SMLC 204 to request assistance data for the selected cells. The E-SMLC 204 determines the requested assistance data for the selected cells 218, and provides the corresponding assistance data to UE in a message 219.

After the UE 201 receives the assistance data, it enters into the idle state 220 again to perform positioning measurements. The UE 201 then switches back to the connected state 221 after the measurements are completed to report the measurements to the E-SMLC 204 in a message 222. The E-SMLC 204 can obtain the location information 223 of the UE by calculating the measurements from the UE 201.

Figure 3:
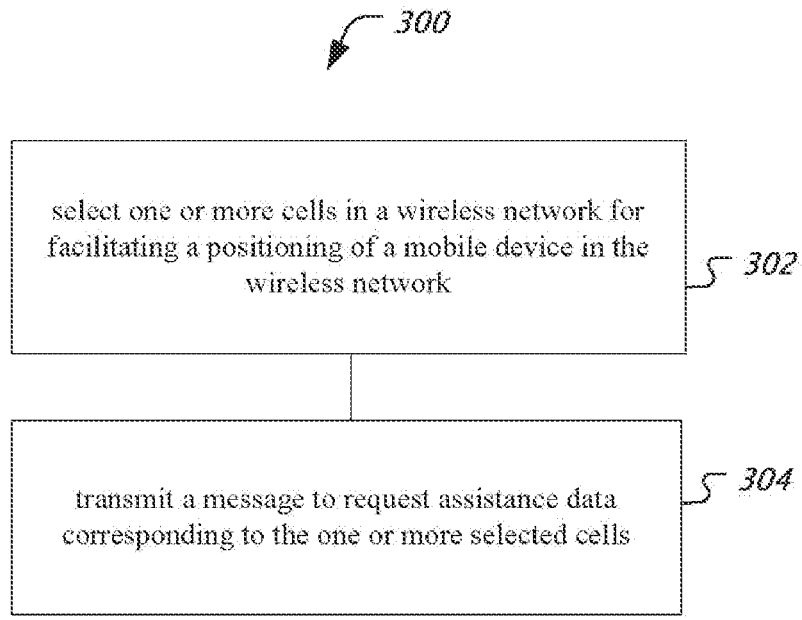
FIG. 3 is a flowchart representation of a method for wireless communication.

FIG. 3 is a flowchart representation of a method 300 for wireless communication. The method 300 includes, at 302, selecting, by a mobile device, one or more cells in a wireless network for facilitating a positioning of the mobile device in the wireless network. The method 300 also includes, at 304, transmitting, from the mobile device to a network node, a message to request assistance data corresponding to the one or more selected cells.

Figure 4:
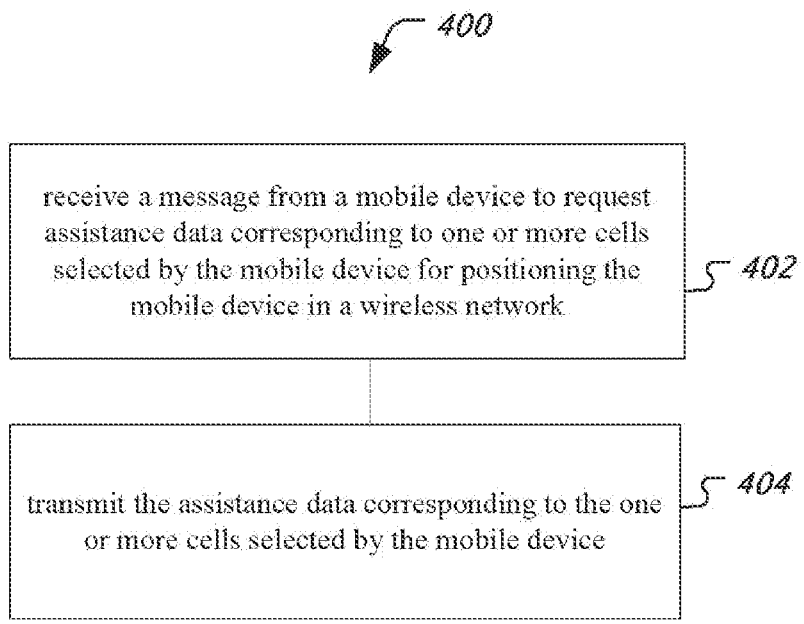
FIG. 4 is a flowchart representation of another method for wireless communication.

FIG. 4 is a flowchart representation of a method 400 for wireless communication. The method 400 includes, at 402, receiving, at a network node, a message from a mobile device to request assistance data corresponding to one or more cells selected by the mobile device for positioning the mobile device in the wireless network. The method 400 also includes, at 404, transmitting, from the network node to the mobile device, the assistance data corresponding to the one or more cells selected by the mobile device.

Example Embodiment 2

In many cases, the assistance data remains unchanged for a long period of time. When the UE moves within its serving cell, its neighboring cells do not change much. When the UE moves out of its serving cell, its reference cell and neighboring cells may undergo bigger changes. Thus, the UE can store the cells previously used for the positioning process. When the UE receives information indicating a new list of neighboring cells via a signal over the broadcast channel, it can detect the changes in neighboring cells and request corresponding assistance data. This embodiment describes techniques that can be used to reduce the amount of assistance data yet improve accuracy of the UE positioning process.

Figure 5:
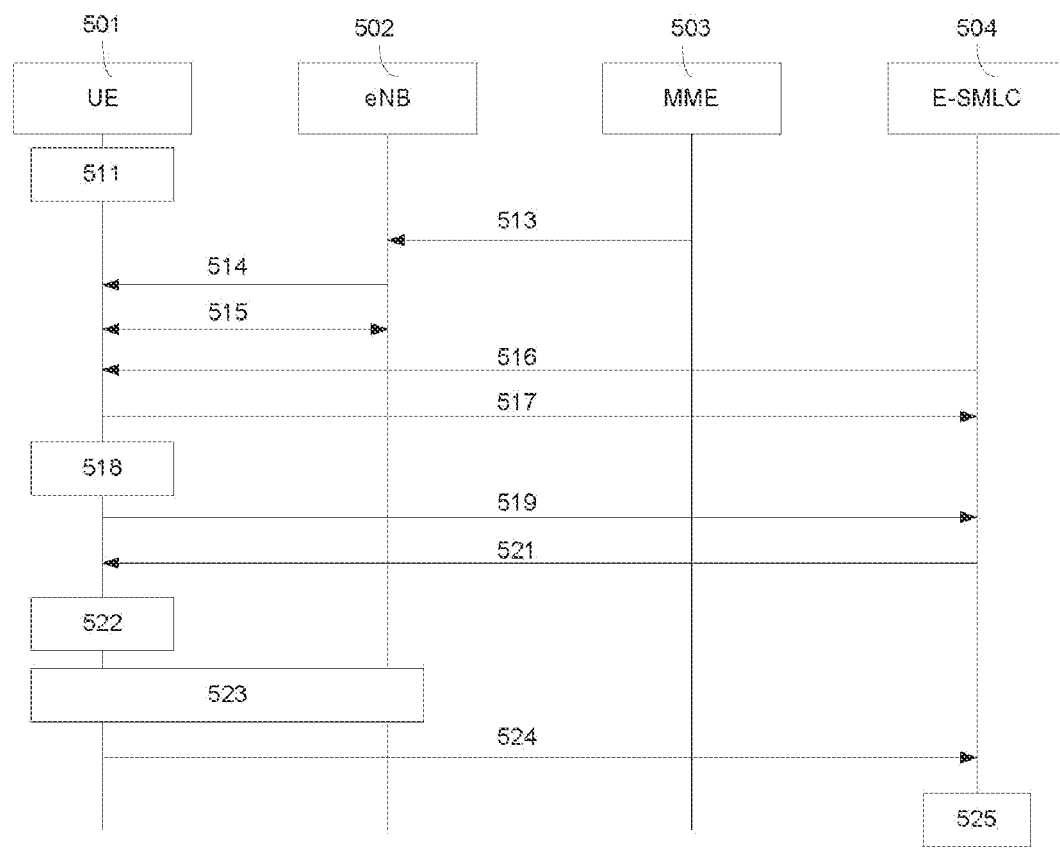
FIG. 5 is a diagram showing a representative signaling process in accordance with the disclosed techniques.

FIG. 5 is a diagram showing a representative signaling process in accordance with the disclosed techniques. The UE 501 can store the list of cells 511 (e.g., $CellList_{old}$) used for the previous positioning process. A new positioning process can be triggered when the network side has a positioning requirement. For example, the MME 503 sends a first paging message 513 to a eNB 202.

The UE 501 is initially in an idle state. The eNB 502 sends the UE 501 a second paging message 514. After receiving the second paging message 514, the UE 501 starts a Radio Resource Control (RRC) connection establishment procedure 515 to enter into a connected state. After the UE 501 is in the connected state, the UE receives a capability request 516 from the E-SMLC 504, and reports its positioning capabilities in a message 517 to the E-SMLC 504.

By comparing its stored cell list to the current neighboring cells (e.g., $CellList_{new}$) signaled over a broadcast channel, the UE can determine the changes in the cell(s) 518 (e.g., $\Delta CellList = CellList_{new} - CellList_{old}$). The UE then requests assistance data for the changed cells (e.g., $\Delta CellList$) in message 519 and receives corresponding assistance data in a message 521. For example, the UE stores cells {A, B, C} used for its previous positioning process. The UE then moves and gets notified that its current neighboring cells are {B, C, D}. Based on the stored information, the UE requests assistance data for cell {D} only.

After the UE 501 receives the assistance data, it enters into the idle state 522 again to perform positioning measurements. The UE 501 then switches back to the connected state 523 after the measurements are completed to report the measurements to the E-SMLC 504 in a message 524. The E-SMLC 504 can obtain the location information 525 of the UE by calculating the measurements from the UE 501.

Example Embodiment 3

This embodiment describes techniques that can be used to reduce the amount of assistance data in the UE positioning process.

Figure 6A:
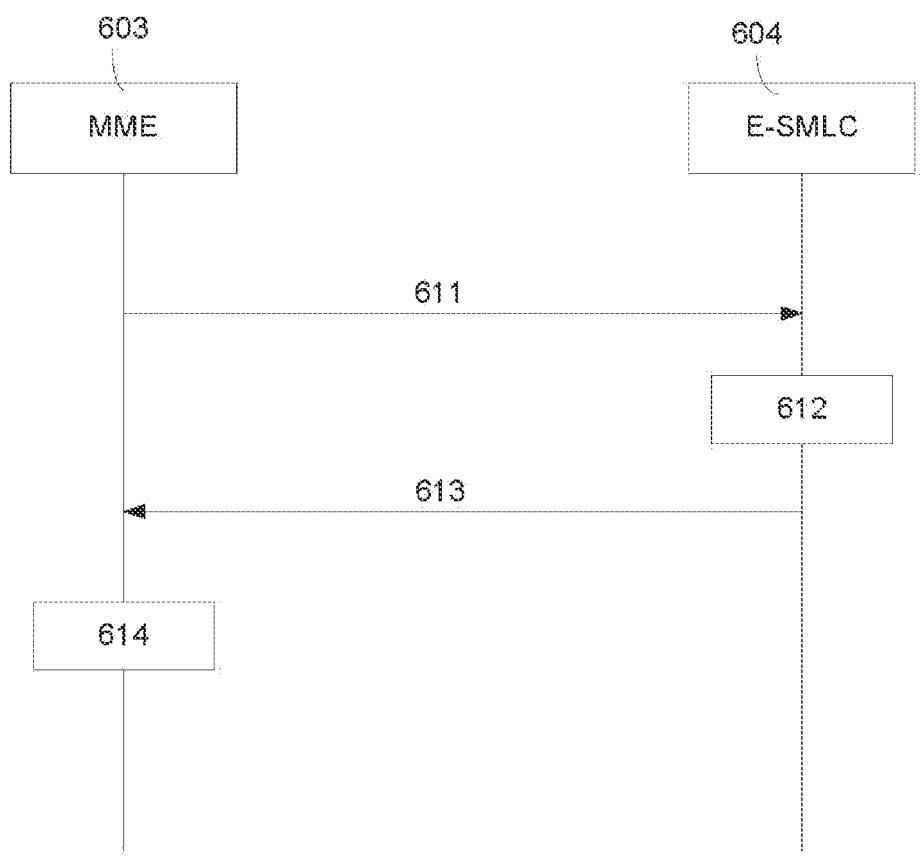
FIG. 6A is a diagram showing a representative signaling process in accordance with the disclosed techniques.

FIG. 6A is a diagram showing a representative signaling process in accordance with the disclosed techniques. In this embodiments, the E-SMLC 604 stores assistance data locally so that it can detect changes in the assistance data. In some embodiments, the assistance data can be stored in a separate node that is accessible to the E-SMLC 604.

As shown in FIG. 6A, the MIME 603 sends a positioning request message 611 to the E-SMLC 604. The message 611 can include information of the cells that are in the tracking area of the UE. After receiving the message 611, the E-SMLC 604 determines, based on the stored assistance data, whether the assistance data for each of the cells in the tracking area of the UE has changed.

In some embodiments, the E-SMLC 604 stores cell-specific assistance data for a UE. Based on the cell-specific assistance data, the E-SMLC 604 sends a message 613 to the MME 603 to indicate whether the assistance data for each of the cells in the tracking area of the UE has changed. If the assistance data has changed for one or more cells in the tracking area, the E-SMLC 604 can include information indicating such changes in the message 613. In some embodiments, the message 613 includes one or more indicators to indicate the assistance data has changed for the cells in the tracking area. In some embodiments, the message 613 includes the changed portion of the assistance data (e.g., $\Delta AssistanceData = AssistanceData_{new} - AssistanceData_{old}$) for each changed cell in the tracking area. If the assistance data has not changed for the cells in the tracking area, the E-SMLC 604 can include one or more indicators indicating that the assistance data has not changed for the cells.

In some embodiments, the E-SMLC 604 stores UE-specific positioning assistance data for a UE. In such cases, the E-SMLC 604 can inform the MME 603 of UE's serving cell based on results of the last positioning process. The E-SMLC 604 can also indicate whether the assistance data for the serving cell has changed. If the assistance data of the serving cell has changed, the E-SMLC 604 can include information indicating such changes in the message 613. In some embodiments, the message 613 includes indicators to indicate the assistance data has changed for the serving cell. In some embodiments, the message 613 includes the changed portion of the assistance data (e.g., $\Delta \text{AssistanceData}=\text{AssistanceData}_{new}-\text{AssistanceData}_{old}$) for the serving cell. If the assistance data has not changed for the serving cell, the E-SMLC 604 can include an indicator indicating that the assistance data has not changed for the serving cell.

The E-SMLC 604 can also indicate whether the assistance data for the non-serving cell(s) in the tracking area has changed. If the assistance data of the non-serving cell(s) has changed, the E-SMLC 604 can include information indicating such changes in the message 613. In some embodiments, the message 613 includes indicators to indicate the assistance data has changed for the non-serving cell(s) in the tracking area. In some embodiments, the message 613 includes the changed portion of the assistance data (e.g., $\Delta \text{AssistanceData}=\text{AssistanceData}_{new}-\text{AssistanceData}_{old}$) for the non-serving cell(s) in the tracking area. If the assistance data has not changed for the non-serving cell(s) in the tracking area, the E-SMLC 604 can include one or more indicators indicating that the assistance data has not changed for the non-serving cell(s).

Figure 6B:
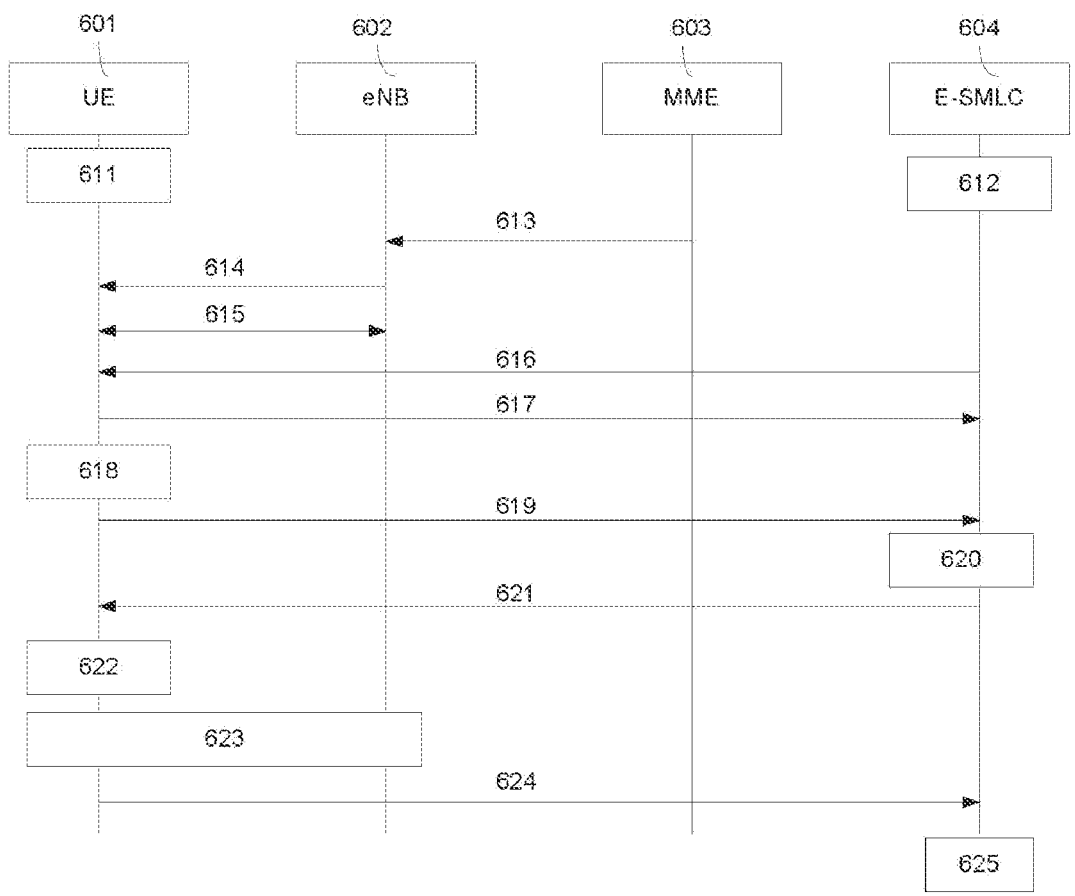
FIG. 6B is a diagram showing another representative signaling process in accordance with the disclosed techniques.

FIG. 6B is a diagram showing another representative signaling process in accordance with the disclosed techniques. The UE 601 can store the list of cells used for the previous positioning process 611 (e.g., $\text{CellList}_{old}$). The E-SMLC 604 also stores assistance data 612 for facilitating the UE positioning. A new positioning process can be triggered when the network side has a positioning requirement. For example, the MME 603 sends a first paging message 613 to a eNB 602.

The UE 601 is initially in an idle state. The eNB 602 sends the UE 601 a second paging message 613. After receiving the second paging message 614, the UE 601 starts a Radio Resource Control (RRC) connection establishment procedure 615 to enter into a connected state. After the UE 601 is in the connected state, the UE receives a capability request 616 from the E-SMLC 604, and reports its positioning capabilities in a message 617 to the E-SMLC 504.

By comparing its stored cell list to the current neighboring cells (e.g., $\text{CellList}_{new}$) signaled over a broadcast channel, the UE then can determine the changes in the cell(s) 618 (e.g., $\Delta \text{CellList}=\text{CellList}_{new}-\text{CellList}_{old}$). The UE requests assistance data for the changed cells (e.g., $\Delta \text{CellList}$) in message 619.

After receiving message 619, the E-SMLC 604 determines, based on the stored assistance data, whether the assistance data for the requested cells 620 has changed. The E-SMLC 604 sends the changed assistance data for the requested cells in a message 621 to the UE 601. In some embodiments, the message 621 also includes changed assistance data for cells that are not requested by the UE 601. For example, the UE 601 detects that its cell list changes from {A, B, C} to {B, C, D}, so it sends a message to request assistance data for $\Delta \text{CellList}=\{D\}$. However, the E-SMLC 604 detects that assistance data for cell E also changes. So the E-SMLC 604 can include the changed assistance data for cells {D, E} in the message 621 to the UE 601.

After the UE 601 receives the changed assistance data in a message 621 from the E-SMLC 604, it enters into the idle state 622 again to perform positioning measurements. The UE 601 then switches back to the connected state 623 after the measurements are completed to report the measurements to the E-SMLC 604 in a message 624. The E-SMLC 604 can obtain the location information 625 of the UE by calculating the measurements from the UE 601.

Example Embodiment 4

Early data transmission allows the UE and the eNB to append data to messages in a random access procedure, e.g., appending uplink data to Msg3 and downlink data to Msg4. This embodiment describes a representative signaling process that can be used to enabled a UE that is capable of early data transmission (EDT) to reduce state transitions for the positioning process when possible. In particular, when the UE supports positioning measurements in the connected state, the number of state transitions that the UE goes through for the positioning process can be reduced.

Figure 7A:
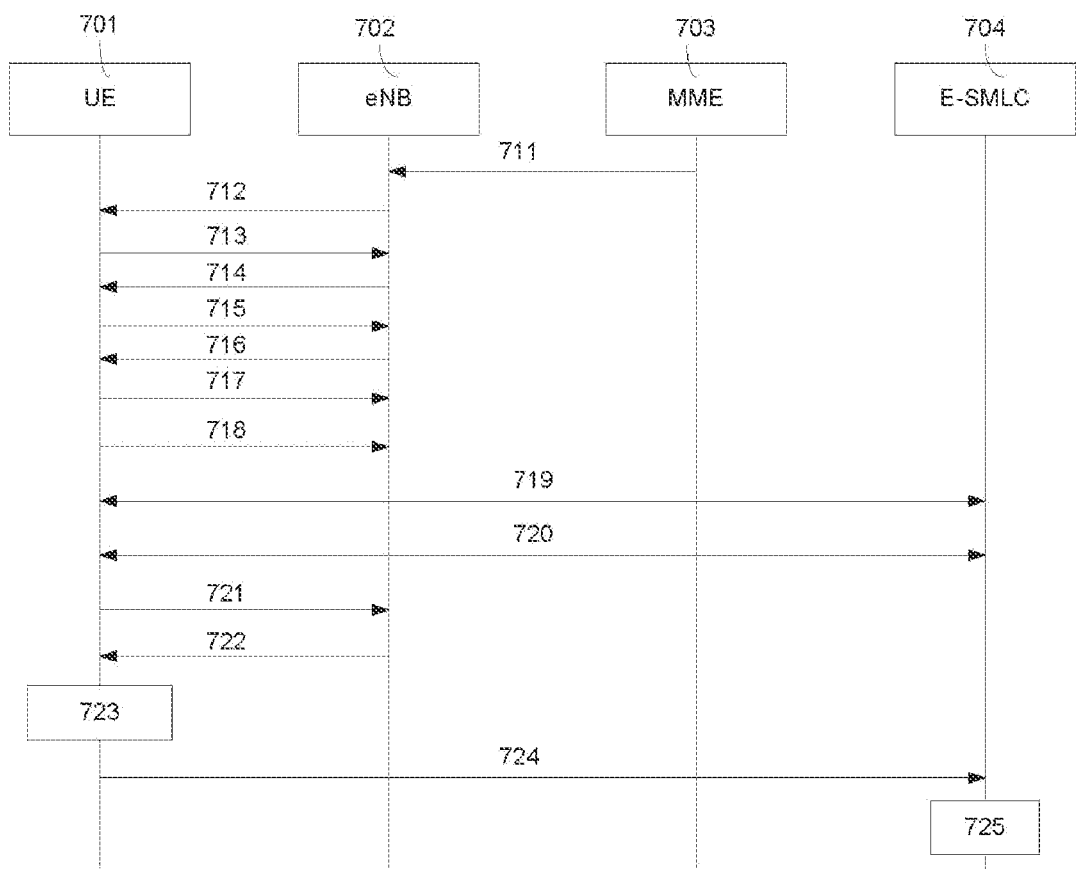
FIG. 7A is a flowchart showing a representative signaling process using early data transmission in accordance with the disclosed techniques.

FIG. 7A is a flowchart showing a representative signaling process using early data transmission in accordance with the disclosed techniques. The positioning process can be triggered when the network side has a positioning requirement. For example, the MME 703 sends a first paging message 711 to a eNB 702. The UE 701 is initially in an idle state. The eNB 702 sends the UE 701 a second paging message 712.

In this particular embodiment, the eNB 702 includes information that indicates early data transmission (EDT) to instruct the UE 701 to initiate a random access procedure with EDT. After the UE receives the second paging message 712, the UE detects the information for the EDT and initiates the random access procedure. The UE first sends a Msg1 713 to the eNB 702, and receives a random access response in Msg2 714 from the eNB 702. Operating with early data transmission, the UE can send its positioning capabilities in the connected state 718 (e.g., the positioning methods that the UE supports) in parallel with transmission of Mg3 715 or Mg5 717. For example, Msg3 can include a special information element (e.g., dedicatedInfoNAS) so that the UE can include its positioning capabilities in Msg3 715. Similarly, Mg5 can include a special information element (e.g., dedicatedInfoNAS) so that the UE can include its positioning capabilities in Msg5 717.

After the UE 701 completes the random access procedure, the UE 701 exchanges information with the E-SMLC 704 regarding other UE positioning capabilities 719 and assistance data 720. The UE 701 then sends a message 721 to the eNB 702 to indicate a completion of the information exchange. In some embodiments, the UE 701 includes a positioning request in the message 721 to the eNB 702.

If the UE 701 supports a positioning method that allows the UE 701 to perform measurements in the connected state, the eNB 702 determines, based on UE's positioning capabilities 718 obtained in the random access procedure, a positioning method for performing measurements. For example, if the coverage level of the serving cell is a normal coverage level, or a coverage enhancement level (CEL) that is lower than a predetermined threshold (e.g., CEL2), the eNB decides that the UE can perform measurements in the connected state. The eNB 702 then sends a message 722 to instruct the UE 701 to use this method for performing measurements.

After the UE 701 receives the message 722 from the eNB 702, it performs positioning measurements in the connected state 723. Then the UE 601 reports the measurements 724 to the E-SMLC 704 without any state transitions. The E-SMLC 704 can obtain the location information 725 of the UE by calculating the measurements from the UE 701.

Figure 7B:
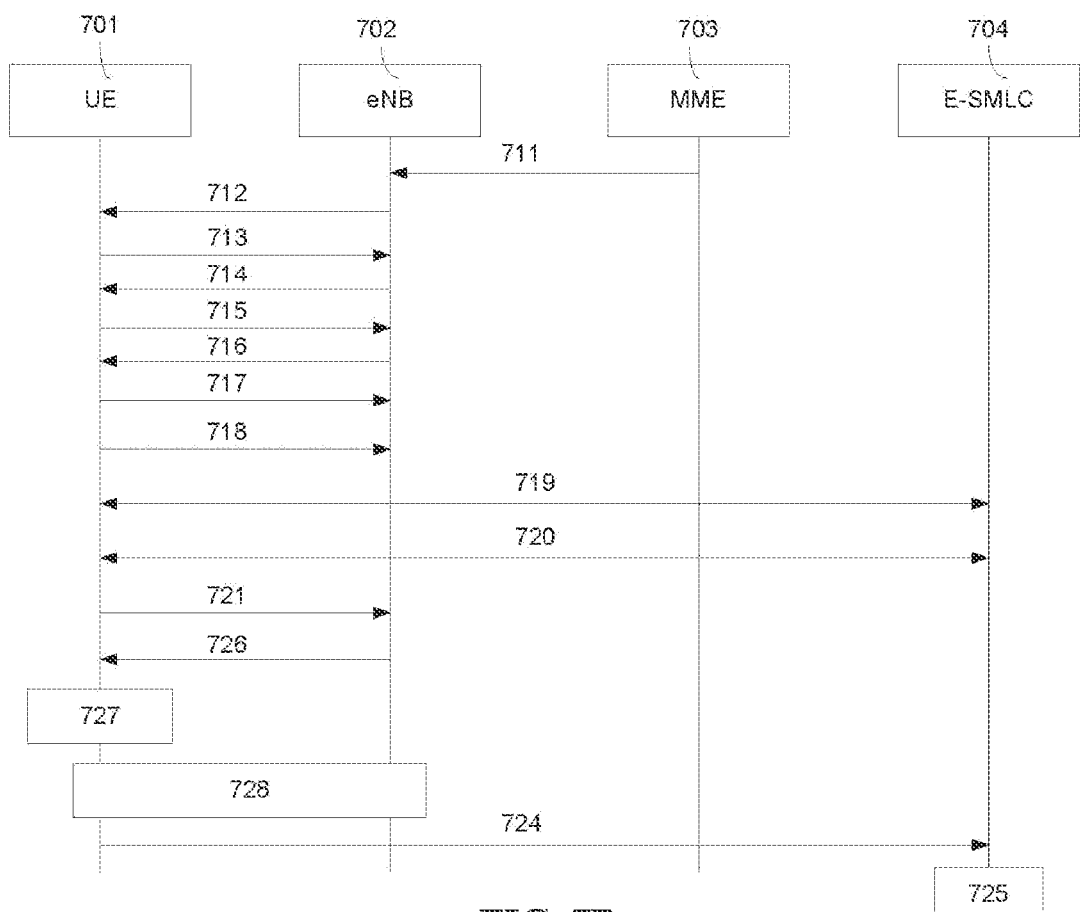
FIG. 7B is a flowchart showing another representative signaling process using early data transmission (EDT) in accordance with the disclosed techniques.

In some embodiments, the eNB may decide that a different positioning method is more desirable, even though the UE supports positioning measurements in the connected state. For example, as shown in FIG. 7B, if the coverage level of the serving cell is a CEL that higher than a predetermined threshold (e.g., CEL2), the eNB 702 decides that it is desirable for the UE to perform measurements in the idle state. The eNB 702 then sends a message 726 to the UE 701 to instruct it to perform a fast release of the current connection and perform positioning measurements in the idle state.

After the UE 701 receives the message 726 from the eNB 702, it releases the current connection and enters into the idle state 727 to perform positioning measurements. The UE 701 then switches back to the connected state 728 after the measurements are completed to report the measurements to the E-SMLC 704 in a message 724. The E-SMLC 704 can obtain the location information 725 of the UE by calculating the measurements from the UE 701.

Example Embodiment 5

This embodiment describes another representative signaling process that can be used to enabled a UE that is capable of early data transmission (EDT) to reduce state transitions for the positioning process when possible.

Figure 8A:
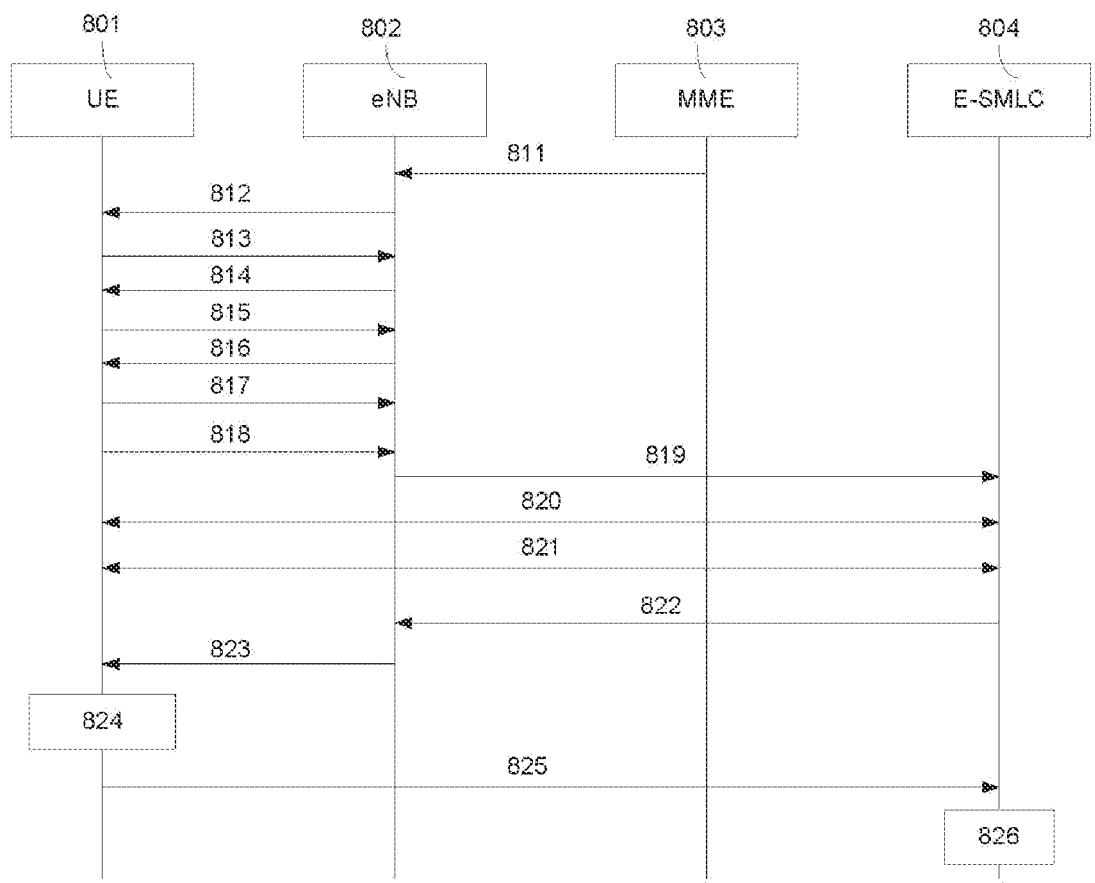
FIG. 8A is a flowchart showing a representative signaling process using EDT in accordance with the disclosed techniques.

FIG. 8A is a flowchart showing a representative signaling process using EDT in accordance with the disclosed techniques. The positioning process can be triggered when the network side has a positioning requirement. For example, the MME 803 sends a first paging message 811 to a eNB 802.

The UE 801 is initially in an idle state. The eNB 802 sends the UE 801 a second paging message 812. In this particular embodiment, the eNB 802 includes information that indicates early data transmission (EDT) to instruct the UE 801 to initiate a random access procedure with EDT. After the UE receives the second paging message 812, the UE detects the information for the EDT and initiates the random access procedure. The UE first sends a Msg1 813 to the eNB 802, and receives a random access response in Msg2 814 from the eNB 802. Operating with early data transmission, the UE can send its positioning capabilities 818 (e.g., the positioning methods that the UE supports) in parallel with transmission of Mg3 815 or Mg5 817. For example, Msg3 can include a special information element (e.g., dedicatedInfoNAS) so that the UE can include its positioning capabilities in Msg3 815. Similarly, Mg5 can include a special information element (e.g., dedicatedInfoNAS) so that the UE can include its positioning capabilities in Msg5 817.

After the UE 801 completes the random access procedure, the eNB 802 reports UE's capabilities (e.g., the positioning methods that the UE supports) to the E-SMLC in a message 819. The UE 801 also exchanges information with the E-SMLC 804 regarding UE's other capabilities 820 and assistance data 821. The E-SMLC then sends a message 822 to the eNB 802 to indicate a completion of information exchange.

If the UE 801 supports a positioning method that allows the UE 801 to perform measurements in a connected state, the eNB 802 determines, based on UE's positioning capabilities 818 obtained in the random access procedure, a positioning method for performing measurements. For example, if the coverage level of the serving cell is a normal coverage level, or a coverage enhancement level (CEL) that is lower than a predetermined threshold (e.g., CEL2), the eNB decides that the UE can perform measurements in the connected state. The eNB 802 then sends a message 823 to instruct the UE 801 to use this method for performing measurements.

After the UE 801 receives the message 823 from the eNB 802, it performs positioning measurements in the connected state 824. Then the UE 801 reports the measurements 825 to the E-SMLC 804 without any state transitions. The E-SMLC 804 can obtain the location information 826 of the UE by calculating the measurements from the UE 801.

Figure 8B:
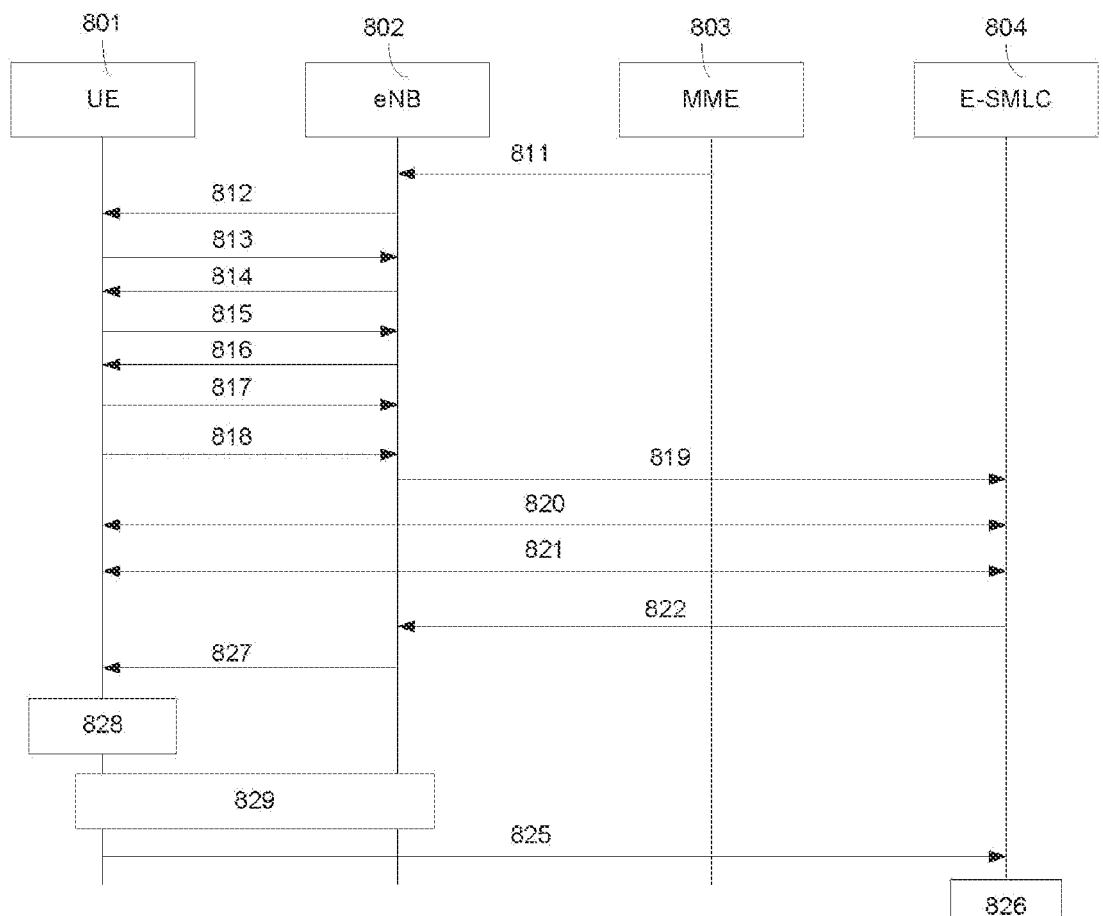
FIG. 8B is a flowchart showing another representative signaling process using EDT in accordance with the disclosed techniques.

In some embodiments, the eNB may decide that a different positioning method is more desirable, even though the UE supports positioning measurements in the connected state. For example, as shown in FIG. 8B, if the coverage level of the serving cell is a CEL that higher than a predetermined threshold (e.g., CEL2), the eNB 802 decides that it is desirable for the UE to perform measurements in the idle state. The eNB 802 then sends a message 827 to the UE 801 to instruct it to perform a fast release of the current connection and perform positioning measurements in the idle state.

After the UE 801 receives the changed assistance data in a message 827 from the eNB 802, it releases the current connection and enters into the idle state 828 to perform positioning measurements. The UE 801 then switches back to the connected state 829 after the measurements are completed to report the measurements to the E-SMLC 804 in a message 825. The E-SMLC 804 can obtain the location information 826 of the UE by calculating the measurements from the UE 801.

Example Embodiment 6

This embodiment describes a representative signaling process that can be used to reduce state transitions for the UE when possible. In particular, when the UE supports positioning measurements in the connected state, the number of state transitions that the UE goes through for the positioning process can be reduced.

Figure 9A:
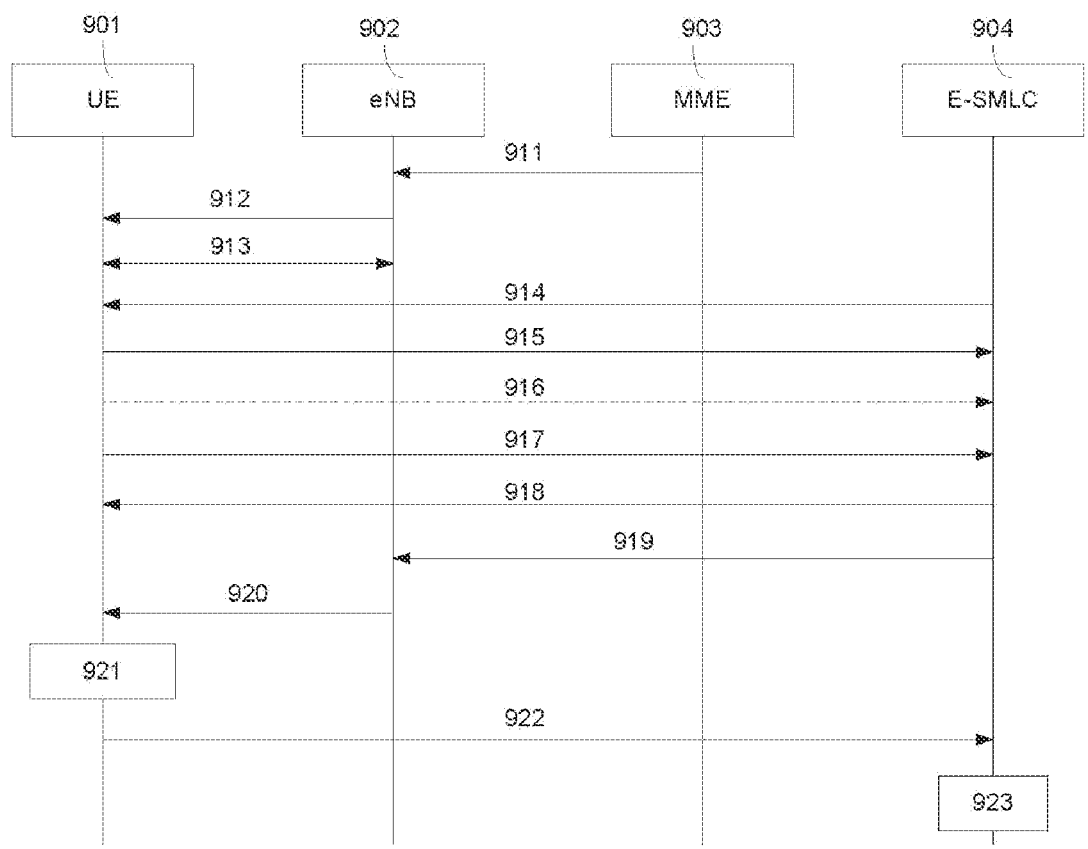
FIG. 9A is a diagram showing a representative signaling process in accordance with the disclosed techniques.

FIG. 9A is a diagram showing a representative signaling process in accordance with the disclosed techniques. The positioning process can be triggered when the network side has a positioning requirement. For example, the MME 903 sends a first paging message 911 to a eNB 902.

The UE 901 is initially in an idle state. The eNB 902 sends the UE 901 a second paging message 912. After receiving the second paging message 912, the UE 901 starts a Radio Resource Control (RRC) connection establishment procedure 913 to enter into a connected state. After the UE 901 is in the connected state, the UE receives a capability request 914 from the E-SMLC 904, and reports its positioning capabilities in a message 915 to the E-SMLC 904. The UE 901 also transmit a message 917 to the E-SMLC 904 to request assistance data for selected cells, and receives the corresponding assistance data in a message 918 from the E-SMLC 904.

The UE can also send its positioning capabilities in the connected state 916 (e.g., the positioning methods that the UE supports) in parallel with transmission of other capabilities 915 or request for assistance data 917. For example, the UE can include its positioning capabilities in the connected state along with other positioning capabilities in the message 915. After the information exchange with the UE 901, the E-SMLC 904 sends a message 919 to the eNB 920 to indicate a completion of the information exchange. The E-SMLC 904 also includes UE's positioning capabilities in the connected state (e.g., the positioning methods that the UE supports) in the message 919.

If the UE 901 supports a positioning method that allows the UE 901 to perform measurements in the connected state, the eNB 902 determines, based on UE's positioning capabilities included in the message 919, a positioning method for performing measurements. For example, if the coverage level of the serving cell is a normal coverage level, or a coverage enhancement level (CEL) that is lower than a predetermined threshold (e.g., CEL2), the eNB decides that the UE can perform measurements in the connected state. The eNB 902 then sends a message 920 to instruct the UE 901 to use this method for performing measurements.

After the UE 921 receives the message 920 from the eNB 902, it performs positioning measurements in the connected state 921. Then the UE 901 reports the measurements 922 to the E-SMLC 904 without any state transitions. The E-SMLC 904 can obtain the location information 923 of the UE by calculating the measurements from the UE 901.

Figure 9B:
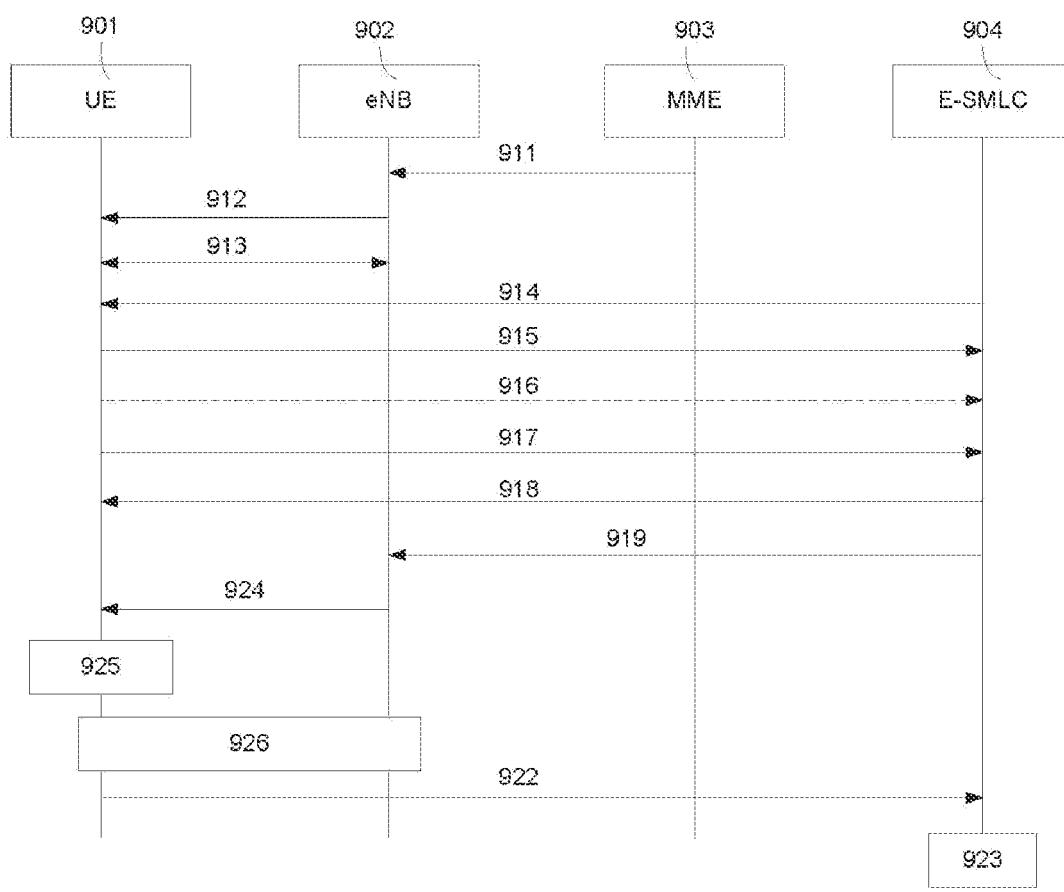
FIG. 9B is a diagram showing another representative signaling process in accordance with the disclosed techniques.

In some embodiments, the eNB may decide that a different positioning method is more desirable, even though the UE supports positioning measurements in the connected state. For example, as shown in FIG. 9B, if the coverage level of the serving cell is a CEL that higher than a predetermined threshold (e.g., CEL2), the eNB 902 decides that it is desirable for the UE to perform measurements in the idle state. The eNB 902 then sends a message 924 to the UE 901 to instruct it to perform a fast release of the current connection and perform positioning measurements in the idle state.

After the UE 901 receives the message 924 from the eNB 902, it releases the current connection and enters into the idle state 925 to perform positioning measurements. The UE 901 then switches back to the connected state 926 after the measurements are completed to report the measurements to the E-SMLC 904 in a message 922. The E-SMLC 904 can obtain the location information 923 of the UE by calculating the measurements from the UE 901.

Figure 10:
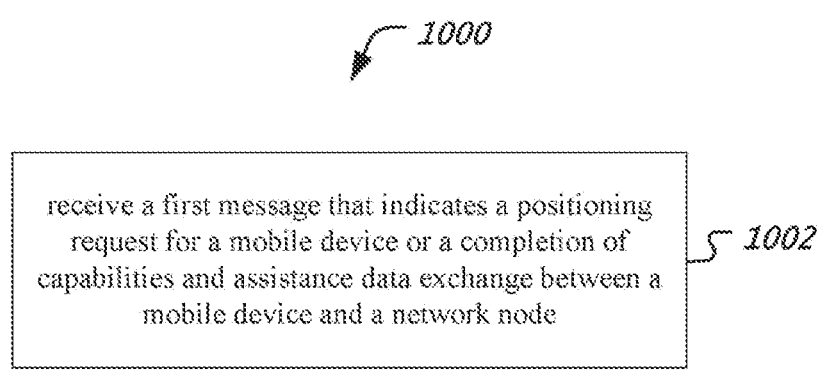
FIG. 10 is a flowchart representation of a method for wireless communication.

FIG. 10 is a flowchart representation of a method 1000 for wireless communication. The method includes, at 1002, receiving, at a wireless communication node, a first message that indicates a positioning request for a mobile device or a completion of capabilities and assistance data exchange between a mobile device and a network node.

Figure 11:
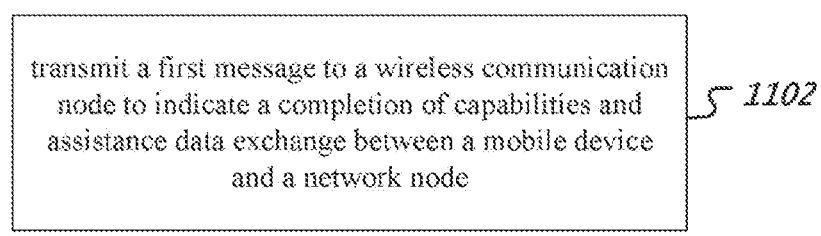
FIG. 11 is a flowchart representation of another method for wireless communication.

FIG. 11 is a flowchart representation of a method 1100 for wireless communication. The method includes, at 1102, transmitting, from a mobile device, a first message to a wireless communication node, the first message that indicates a positioning request for a mobile device or a completion of capabilities and assistance data exchange between the mobile device and a network node.

Figure 12:
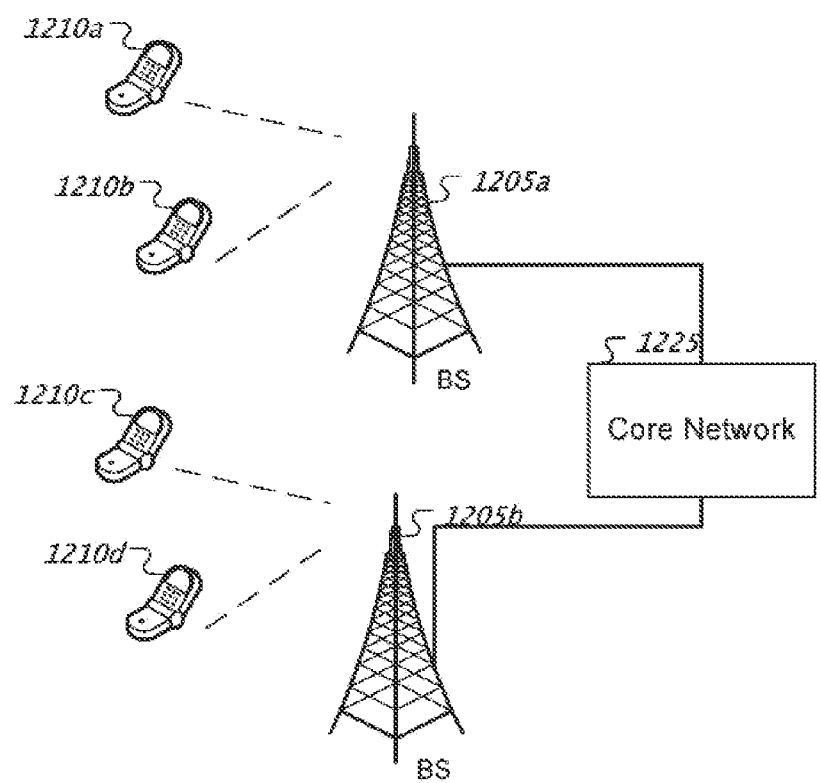
FIG. 12 shows an example of a wireless communication system where techniques in accordance with one or more embodiments of the present technology can be applied.

FIG. 12 shows an example of a wireless communication system where techniques in accordance with one or more embodiments of the present technology can be applied. A wireless communication system 1200 can include one or more base stations (BSs) 1205*a*, 1205*b*, one or more wireless devices 1210*a*, 1210*b*, 1210*c*, 1210*d*, and a core network 1225. A base station 1205*a*, 1205*b* can provide wireless service to wireless devices 1210*a*, 1210*b*, 1210*c* and 1210*d* in one or more wireless sectors. In some implementations, a base station 1205*a*, 1205*b* includes directional antennas to produce two or more directional beams to provide wireless coverage in different sectors.

The core network 1225 can communicate with one or more base stations 1205*a*, 1205*b*. The core network 1225 provides connectivity with other wireless communication systems and wired communication systems. The core network may include one or more service subscription databases to store information related to the subscribed wireless devices 1210*a*, 1210*b*, 1210*c*, and 1210*d*. A first base station 1205*a* can provide wireless service based on a first radio access technology, whereas a second base station 1205*b* can provide wireless service based on a second radio access technology. The base stations 1205*a* and 1205*b* may be co-located or may be separately installed in the field according to the deployment scenario. The wireless devices 1210*a*, 1210*b*, 1210*c*, and 1210*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 13:
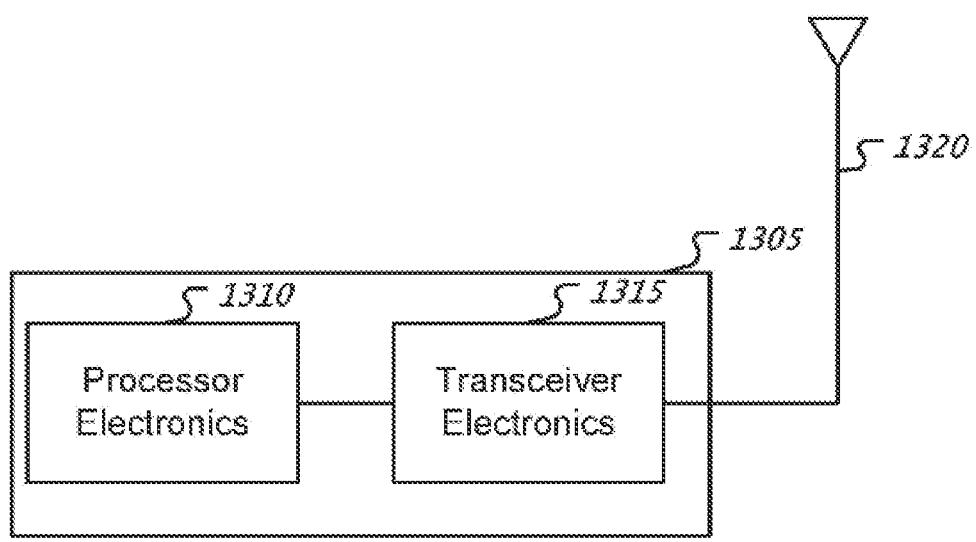
FIG. 13 is a block diagram representation of a portion of a radio station.

FIG. 13 is a block diagram representation of a portion of a radio station. A radio station 1305 such as a base station or a wireless device (or UE) can include processor electronics 1310 such as a microprocessor that implements one or more of the wireless techniques presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305.

It is thus evident that methods and corresponding apparatus relating to data transmission and accuracy for positioning User Equipment (UE) in a network are disclosed. Using the disclosed techniques, the UE can request a smaller amount of assistance data while improving the accuracy of the positioning process. The UE can also undergo fewer number of state transitions to obtain the assistance data when it is capable of performing positioning measurements in a connected state, thereby reducing system resource overhead and power consumption of the UE.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
   receiving, by a user device from a network node, a message that instructs the user device to perform positioning measurement in an idle state; and
   performing, by the user device, measurements in the idle state based on the message,
   wherein the method further comprises, in response to the receiving the message:
   sending, by the user device to the network node, a first message including a random access preamble;
   receiving, by the user device from the network node, a second message including a random access response; and
   sending, by the user device to the network node, a third message including positioning information of the user device.

2. The method of claim 1, further comprising:
   reporting, by the user device in a connected state, the measurements.

3. The method of claim 1, further comprising:
   switching, by the user device, to a connected state after performing the measurements, such that the measurements are reported in the connected state.

4. The method of claim 1, wherein the user device is configured to perform an early data transmission which transmits data using the first message, the second message, and the third message during a random access procedure.

5. The method of claim 1, further comprising:
   performing, by the user device with another network node, an information exchange regarding additional positioning capabilities of the user device and assistance data.

6. The method of claim 5, further comprising:
   sending, by the user device to the network node, a completion message indicating a completion of the information exchange.

7. The method of claim 1, wherein the receiving the message is performed in a connected state or in the idle state.

8. The method of claim 7, wherein the message further instructs the user device to release a connection and enter the idle state to perform the measurements when the receiving the message is performed in the connected state.

9. A method for wireless communication, comprising:
   sending, by a network node to a user device, a message that instructs the user device to perform positioning measurement in an idle state;

receiving, by the network node, positioning measurement from the user device in a connected state, wherein the method further comprises, after the sending the message:

receiving, by the network node from the user device, a first message including a random access preamble;

sending, by the network node to the user device, a second message including a random access response;

receiving, by the network node from the user device, a third message including positioning information of the user device.

10. The method of claim 9, wherein the message is sent to the user device in the connected state or in the idle state.

11. The method of claim 10, wherein the message further instructs the user device to release a connection when the message is sent to the user device in the connected state.

12. The method of claim 9, further comprising:

receiving a completion message indicating a completion of an information exchange regarding additional positioning capabilities of the user device and assistance data.

13. A device for wireless communication comprising a processor, and a memory including processor executable code, wherein the processor executable code upon execution by the processor configures the processor to:

receive, from a network node, a message that instructs the device to perform positioning measurement in an idle state;

perform measurements in the idle state based on the message, wherein the processor is further configured to, in response to the receiving the message:

send a first message including a random access preamble;

receive a second message including a random access response; and send a third message including positioning information of the device.

14. The device of claim 13, wherein the processor is further configured to: report the measurements in a connected state.

15. The device of claim 13, wherein the message is received in a connected state or in the idle state.

16. The device of claim 15, wherein the message further instructs to release a connection and enter the idle state to perform the measurements when the message is received in the connected state.

17. The device of claim 13, wherein the processor is further configured to:

switch to a connected state after performing the measurements such that the measurements are reported in the connected state.

18. The device of claim 13, wherein the processor is further configured to:

switch to a connected state after performing the measurements such that the measurements are reported in the connected state.

19. The device of claim 13, wherein the processor is further configured to:

perform an early data transmission which transmits data using the first message, the second message, and the third message during a random access procedure.

20. The device of claim 13, wherein the processor is further configured to:

perform an information exchange regarding additional positioning capabilities of the device and assistance data.

* * * * *